United States Patent
Berner et al.

(10) Patent No.: US 10,886,542 B2
(45) Date of Patent: Jan. 5, 2021

(54) FUEL CELL

(71) Applicant: Robert Bosch GmbH, Stuttgart (DE)

(72) Inventors: Ulrich Berner, Stuttgart (DE); Stefan Schoenbauer, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 32 days.

(21) Appl. No.: 16/334,184

(22) PCT Filed: Jul. 25, 2017

(86) PCT No.: PCT/EP2017/068730
§ 371 (c)(1),
(2) Date: Mar. 18, 2019

(87) PCT Pub. No.: WO2018/054580
PCT Pub. Date: Mar. 29, 2018

(65) Prior Publication Data
US 2019/0207229 A1    Jul. 4, 2019

(30) Foreign Application Priority Data
Sep. 21, 2016   (DE) .......................... 10 2016 218 062

(51) Int. Cl.
*H01M 8/0258* (2016.01)
*B60K 6/28* (2007.10)
(Continued)

(52) U.S. Cl.
CPC ............. *H01M 8/0258* (2013.01); *B60K 6/28* (2013.01); *B60K 6/32* (2013.01); *B60L 50/72* (2019.02);
(Continued)

(58) Field of Classification Search
CPC .. H01M 8/0228; H01M 8/0247; H01M 8/025; H01M 8/0252; H01M 8/0254
See application file for complete search history.

(56) References Cited

U.S. PATENT DOCUMENTS

2009/0136805 A1*  5/2009  Sato ..................... H01M 8/0258
                                                         429/434
2009/0155665 A1*  6/2009  Hashimoto ......... H01M 8/0247
                                                         429/437
(Continued)

FOREIGN PATENT DOCUMENTS

DE    102012221730    5/2014
DE    102013223817    5/2015
(Continued)

OTHER PUBLICATIONS

International Search Report for Application No. PCT/EP2017/068730 dated Oct. 16, 2017 (English Translation, 2 pages).

*Primary Examiner* — Ula C Ruddock
*Assistant Examiner* — Matthew W Van Oudenaren
(74) *Attorney, Agent, or Firm* — Michael Best & Friedrich LLP

(57) ABSTRACT

The invention relates to a fuel cell (2) comprising at least one membrane electrode assembly (10) and at least one flow field plate (40) comprising a separator plate (50). The flow field plate (40) has at least one structural part (51, 52) which comprises a base body (60) in which recesses (65) are introduced, and vanes (61, 62) which extend from sides (70, 72) of the recesses (65) and extend to the at least one membrane electrode assembly (10).

16 Claims, 9 Drawing Sheets

(51) Int. Cl.
    *B60K 6/32*     (2007.10)
    *B60L 50/72*     (2019.01)
    *H01M 8/0206*     (2016.01)
    *H01M 8/0228*     (2016.01)
    *H01M 8/04119*     (2016.01)
    *H01M 8/1018*     (2016.01)
    *H01M 8/0247*     (2016.01)

(52) U.S. Cl.
    CPC ....... *H01M 8/0206* (2013.01); *H01M 8/0228* (2013.01); *H01M 8/04156* (2013.01); *B60Y 2200/91* (2013.01); *B60Y 2200/92* (2013.01); *B60Y 2400/202* (2013.01); *H01M 8/0247* (2013.01); *H01M 2008/1095* (2013.01); *H01M 2250/20* (2013.01)

(56) References Cited

U.S. PATENT DOCUMENTS

| | | |
|---|---|---|
| 2013/0065153 A1 | 3/2013 | Bae et al. |
| 2014/0147762 A1 | 5/2014 | Maass et al. |
| 2014/0162164 A1* | 6/2014 | Jin .................. H01M 8/0206 429/463 |

FOREIGN PATENT DOCUMENTS

| | | |
|---|---|---|
| DE | 102013226815 | 6/2015 |
| DE | 102014207594 | 10/2015 |
| EP | 0418528 | 3/1991 |
| JP | H02160371 A | 6/1990 |
| JP | H03011557 A | 1/1991 |
| JP | 2006252974 A | 9/2006 |
| JP | 2010061994 | 3/2010 |
| JP | 2013093184 A | 5/2013 |
| JP | 5252193 | 7/2013 |

* cited by examiner

FUEL CELL

BACKGROUND OF THE INVENTION

The invention relates to a fuel cell comprising at least one membrane-electrode unit and at least one bipolar plate which comprises a separator plate.

A fuel cell is a galvanic cell which converts the chemical reaction energy of a continuously supplied fuel and an oxidant into electrical energy. A fuel cell is thus an electrochemical energy converter. In known fuel cells, hydrogen ($H_2$) and oxygen ($O_2$) in particular are converted into water ($H_2O$), electrical energy and heat. Fuel cells are, however, also known which operate with methanol or methane or mixtures thereof.

Inter alia, proton-exchange membrane (PEM) fuel cells are known. Proton-exchange membrane fuel cells have a centrally arranged membrane which is exclusively permeable to protons, i.e. only to hydrogen ions. As a result, the oxidant, in particular atmospheric oxygen, is spatially separated from the fuel, in particular hydrogen. Proton-exchange membrane fuel cells furthermore have an anode and a cathode. The fuel is supplied to the anode of the fuel cell and catalytically oxidized to protons while releasing electrons. The protons pass through the membrane to the cathode. The released electrons are drawn off from the fuel cell and flow via an external circuit to the cathode. The oxidant is supplied to the cathode of the fuel cell where, by taking up the electrons from the external circuit and protons which have passed through the membrane to the cathode, it reacts to yield water. The resultant water is drawn off from the fuel cell.

A voltage here arises between the anode and cathode of the fuel cell. The voltage can be increased by mechanically arranging a plurality of fuel cells in succession to form a fuel cell stack and connecting them electrically in series.

Distributor plates, also known as flow fields, are provided to ensure uniform distribution of the fuel at the anode and uniform distribution of the oxidant at the cathode. The flow fields for example have channel-like structures for distributing the fuel and oxidant. A combination of a plurality of distributor plates, which also serves to provide contact between two cells, is known as a bipolar plate. The bipolar plates may furthermore include structures for passing a cooling liquid through the fuel cell to dissipate heat.

DE 10 2013 226 815 A1 discloses a fuel cell stack which comprises a plurality of fuel cells each with a membrane-electrode unit. The membrane-electrode unit is here enclosed by two separator plates which take the form of bipolar plates.

A fuel cell with a bipolar plate which is made up of two plate halves is known from DE 10 2012 221 730 A1. Each of the two plate halves here has a distributor structure which is provided to distribute the reaction gases and a cooling liquid.

A bipolar plate for a fuel cell is known from DE 10 2014 207 594 A1. The bipolar plate here has a sinuous channel which for example takes the form of a groove. The sinuous channel serves to introduce hydrogen or oxygen into the fuel cell.

DE 10 2013 223 817 A1 discloses a fuel cell stack with a plurality of fuel cells. Each fuel cell here comprises a membrane-electrode unit which is surrounded by media distribution units.

A fuel cell which has gas diffusion layers for distributing the fuel and the air is known from JP 5252193 B2 and JP 2010-061992 A. A metallic grating is here arranged between the gas diffusion layers and a separator plate.

JP 2010-061994 A discloses a fuel cell which comprises a metallic grating for passage of a gas. The grating here has large and small orifices which are arranged in alternating manner.

SUMMARY OF THE INVENTION

A fuel cell is proposed which comprises at least one membrane-electrode unit and at least one bipolar plate. The bipolar plate here comprises a separator plate. The membrane-electrode unit comprises an anode and a cathode and, arranged therebetween, a membrane. A media chamber is here formed in the bipolar plate between the membrane-electrode unit and the separator plate, which chamber is provided for feeding a fuel to the anode or for feeding atmospheric oxygen to the cathode.

According to the invention, the bipolar plate comprises at least one structural part which has a base member into which openings are introduced, and wings which project away from sides of the openings and extend up to the at least one membrane-electrode unit. The base member of the structural part for example takes the form of a flat metal sheet.

According to one advantageous development of the invention, the base member of the at least one structural part lies against the separator plate.

According to another advantageous development of the invention, the base member of the at least one structural part is spaced from the separator plate, and wings extend from sides of the openings up to the separator plate. Some of the wings of the structural part thus extend to the membrane-electrode unit and some to the separator plate.

According to an advantageous further development of the invention, the bipolar plate additionally comprises at least one structural element which likewise has a base member into which openings are introduced, and wings which project away from sides of the openings. Wings of the structural element here project through openings in the structural part, and wings of the structural part project through openings in the structural element.

According to a preferred embodiment of the invention, the base member of the structural element lies against the base member of the structural part. The base member of the structural element for example takes the form of a flat metal sheet.

According to another preferred embodiment of the invention, the base member of the structural element is spaced from the base member of the structural part.

The openings in the base member of the structural part and in the base member of the structural element are advantageously rectangular in shape. Each of the openings in the base member of the structural part and in the base member of the structural element here comprises two opposing longitudinal sides and two opposing lateral sides. The longitudinal sides here extend at right angles to the lateral sides.

The wings of the structural part and the wings of the structural element here project away from opposing longitudinal sides of the openings in the base member of the structural part and the openings in the base member of the structural element.

According to a preferred further development of the invention, at least one fin projects away from the base member from at least one lateral side of the openings in the base member of the structural part and of the openings in the base member of the structural element.

According to an advantageous embodiment of the invention, the ends of the wings remote from the base member of the structural part and from the base member of the structural element have a deflection.

A fuel cell according to the invention is advantageously used in an electric vehicle (EV), a hybrid vehicle (HEV) or in a plug-in hybrid vehicle (PHEV).

In a fuel cell according to the invention, feed of a fuel to the anode and feed of atmospheric oxygen to the cathode are improved by the respective media chamber, while conveying of the resultant product water out of the media chamber is also improved. The invention can alternatively also be used as a flow field in the cooling channel. In addition, electrical contacting of the bipolar plate with the electrodes of the membrane-electrode unit is simplified. The bipolar plate is also relatively straightforward to make by stamping the openings and bending the resultant wings.

BRIEF DESCRIPTION OF THE DRAWINGS

Embodiments of the invention are explained in greater detail with reference to the drawings and the following description.

In the figures.

DETAILED DESCRIPTION

In the following description of the embodiments of the invention, identical or similar elements are denoted by identical reference signs, wherein descriptions of these elements are not repeated in each individual case. The figures are a purely diagrammatic representation of the subject matter of the present invention.

Figure 1:
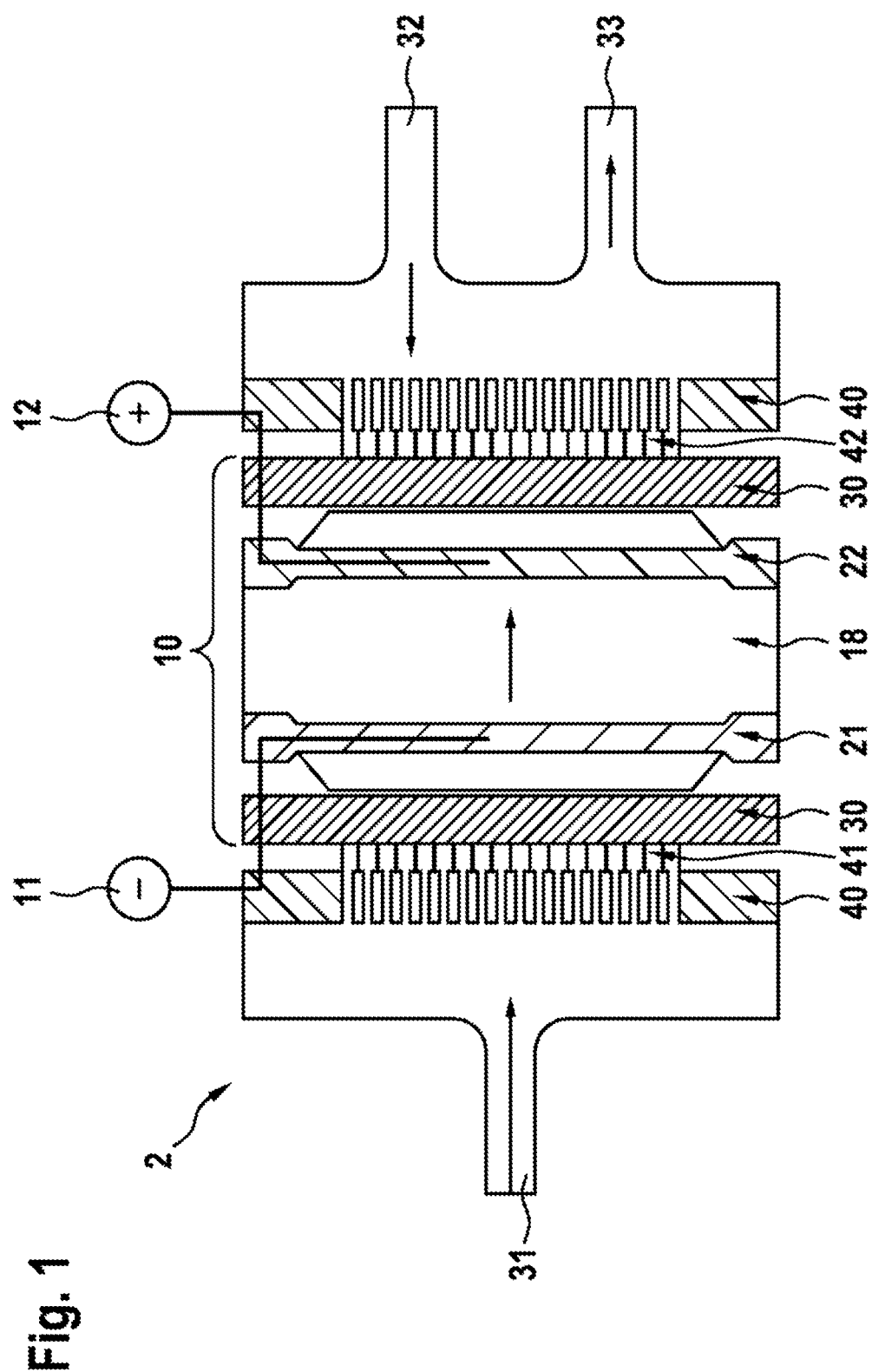
FIG. 1 shows a schematic diagram of a fuel cell.

FIG. 1 shows a fuel cell 2 diagrammatically. The fuel cell 2 comprises a negative terminal 11 and a positive terminal 12. A voltage provided by the fuel cell 2 can be tapped via terminals 11, 12. During operation of the fuel cell 2, an electric current flows between the two terminals 11, 12 via an external circuit.

The fuel cell 2 has a first connection point 31 which serves to feed a fuel, in the present case hydrogen. The fuel cell 2 furthermore has a second connection point 32 which serves to feed an oxidant, in the present case atmospheric oxygen. The fuel cell 2 also has a third connection point 33 which serves to draw off the water formed and the residual air.

The fuel cell 2 furthermore has an anode 21, a cathode 22 and a membrane 18. The membrane 18 is here arranged between the anode 21 and the cathode 22. A first bipolar plate 40, which is connected to the first connection point 31, is arranged on the anode 21 side. A second bipolar plate 40, which is connected to the second connection point 32 and to the third connection point 33, is arranged on the cathode 22 side. The first bipolar plate 40 and the second bipolar plate 40 are electrically conductive and made for example from graphite or metal.

A first gas diffusion layer 30 is provided between the anode 21 and the first bipolar plate 40. The first gas diffusion layer 30 is electrically conductive and made for example from a porous carbon paper. The first gas diffusion layer 30 ensures uniform distribution of the fuel supplied via the first bipolar plate 40 to the anode 21.

A second gas diffusion layer 30 is provided between the cathode 22 and the second bipolar plate 40. The second gas diffusion layer 30 is electrically conductive and made for example from a porous carbon paper. The second gas diffusion layer 30 ensures uniform distribution of the oxidant supplied via the second bipolar plate 40 to the cathode 22.

The anode 21, the cathode 22, the membrane 18 and the two gas diffusion layers 30 together form a membrane-electrode unit 10 which is arranged centrally within the fuel cell 2. The first gas diffusion layer 30 and the second gas diffusion layer 30 are optional and can also be omitted.

A first media chamber 41, which adjoins the membrane-electrode unit 10, is formed in the first bipolar plate 40. The fuel which is supplied to the fuel cell 2 via the first connection point 31 is guided onward through the first media chamber 41 to the anode 21.

A second media chamber 42, which adjoins the membrane-electrode unit 10, is formed in the second bipolar plate 40. The oxidant which is supplied to the fuel cell 2 via the second connection point 32 is guided onward through the second media chamber 42 to the cathode 22. The water arising during operation of the fuel cell 2, together with the unconsumed residual air, is also drawn off from the fuel cell 2 through the second media chamber 42 via the third connection point 33.

The anode 21, the first bipolar plate 40 and the first gas diffusion layer 30 arranged therebetween are electrically connected to the negative terminal 11 of the fuel cell 2. The cathode 22, the second bipolar plate 40 and the second gas diffusion layer 30 arranged therebetween are electrically connected to the positive terminal 12 of the fuel cell 2.

Figure 2:
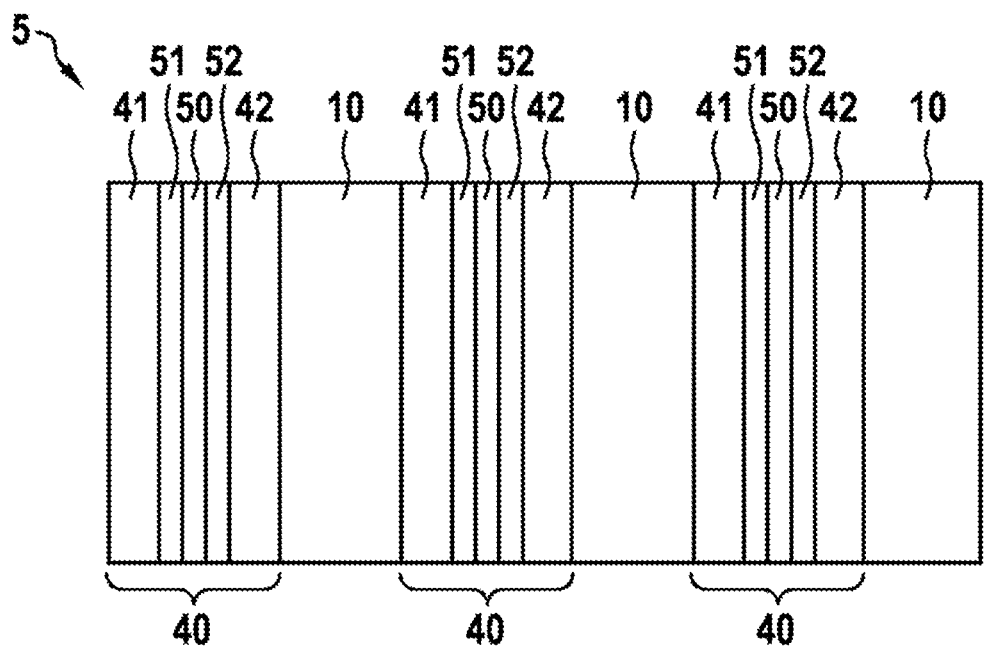
FIG. 2 shows a schematic diagram of a fuel cell stack.

FIG. 2 shows a fuel cell 5 diagrammatically. The fuel cell stack 5 here comprises a plurality of alternately arranged membrane-electrode units 10 and bipolar plates 40. The membrane-electrode units 10 are here made up as shown in FIG. 1 and in each case comprise an anode 21, a cathode 22, a membrane 18 arranged therebetween and two gas diffusion layers 30.

The bipolar plates 40, which are arranged between pairs of membrane-electrode units 10, in each case comprise a centrally arranged separator plate 50. The first media chamber 41 and the second media chamber 42, which each adjoin one of the adjacent membrane-electrode units 10, enclose the separator plate 50.

The bipolar plates 40 furthermore in each case comprise a first structural part 51 which faces the first media chamber 41 and a second structural part 52 which faces the second media chamber 42. The first structural part 51 can also be arranged within the first media chamber 41 and the second structural part 52 can also be arranged within the second media chamber 42.

The bipolar plates 40 furthermore have structures which are not shown here, for example in the form of a coolant chamber for passing a coolant through the fuel cell 2, so enabling dissipation of heat arising during operation of the fuel cell 2 and hence cooling of the fuel cell 2.

Figure 3:
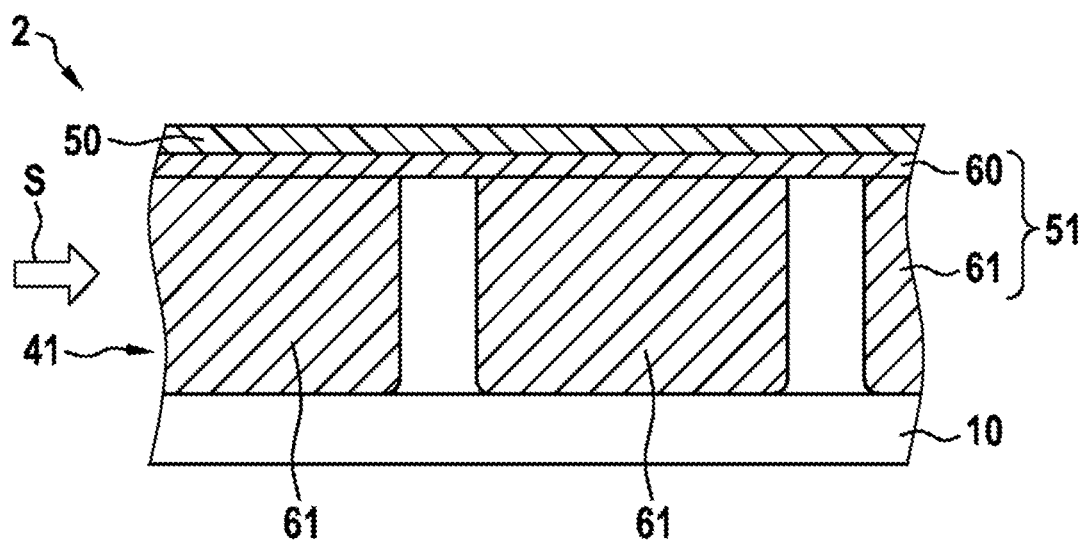
FIG. 3 shows a section through a fuel cell according to a first embodiment.

FIG. 3 shows a section through a fuel cell 2 according to a first embodiment. The separator plate 50 takes the form of a flat metal sheet. A base member 60, in the form of a flat metal sheet, of the first structural part 51 lies against the separator plate 50. The first media chamber 41 is formed between the base member 60 of the first structural part 51 and the membrane-electrode unit 10.

Wings 61, 62 project from the base member 60 of the first structural part 51 through the first media chamber 41 up to the membrane-electrode unit 10. As shown, the second wings 62 are concealed by the first wings 61 and are therefore not visible. During operation of the fuel cell 2, the fuel flows in direction of flow S through the first media chamber 41.

The first structural part 51 can be made from a metal such as for example iron, special steel or titanium. The base member 60 of the first structural part 51 has a thickness of at most 150 μm, preferably at most 75 μm, more preferably at most 25 μm. The first media chamber 41 may have a height of at most 1 mm, preferably at most 700 μm, more preferably at most 350 μm.

The first structural part 51 and the separator plate 50 are mechanically connected together. Suitable connection methods are for example brazing, soldering, diffusion bonding and welding, in particular laser welding, but also other welding methods.

Figure 4:
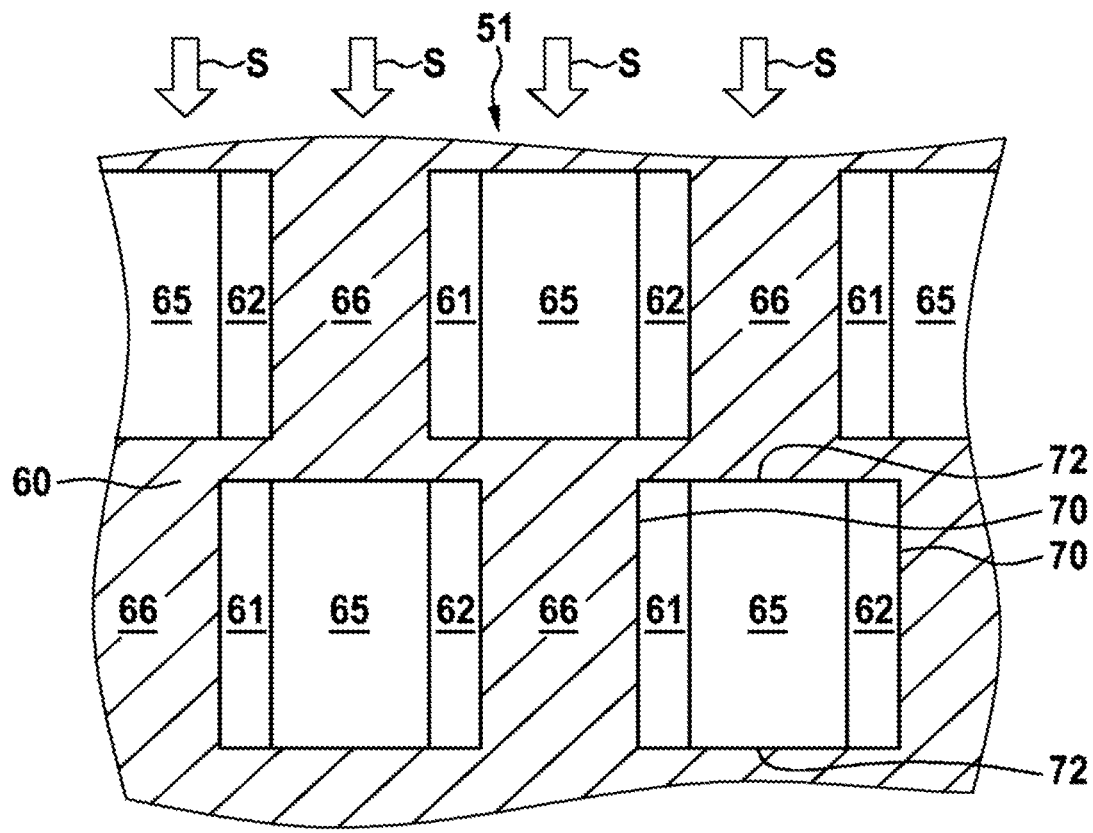
FIG. 4 shows a plan view of a structural part according to a first variant of the fuel cell from FIG. 3.

FIG. 4 shows a plan view of the first structural part 51 according to a first variant of the fuel cell 2 from FIG. 3. A plurality of openings 65 are introduced, in particular stamped, into the base member 60 of the first structural part 51. In the present case, the openings 65 are rectangular in shape and in each case comprise two opposing longitudinal sides 70 and two opposing lateral sides 72. The openings 65 can in particular also be square. The longitudinal sides 70 of the openings 65 extend parallel to the direction of flow S, and the lateral sides 72 of the openings 65 extend at right angles to the direction of flow S.

The openings 65 can also be arranged such that the longitudinal sides 70 of the openings 65 extend at right angles to the direction of flow S, and the lateral sides 72 of the openings 65 extend parallel to the direction of flow S. It is also conceivable for not only the longitudinal sides 70 but also the lateral sides 72 of the openings 65 to extend in inclined manner, for example by an angle of 45°, to the direction of flow S.

The openings 65 can also have any other desired shapes and for example be triangular and hexagonal in shape. Sides 70, 72 of the openings 65 can also extend in inclined manner relative to one another, thus not necessarily parallel or at right angles.

The openings 65 are arranged in rows. Adjacent openings 65 in a row are separated from one another by webs 66. According to the first variant shown here, the openings 65 are distributed uniformly in successive rows in such a way that the webs 66 of the following row are located in the middle of the openings 65 of the preceding row.

The length of the longitudinal sides 70 at most corresponds to the length of the bipolar plate 40, with short pieces of a length of a few millimeters preferably being conceivable. The distance between two rows of openings 65 should be as small as possible, preferably at most 1 mm, more preferably at most 500 μm. The width of the webs 66 is likewise selected to be as narrow as possible, preferably at most 1 mm, more preferably at most 500 μm.

Figure 5:
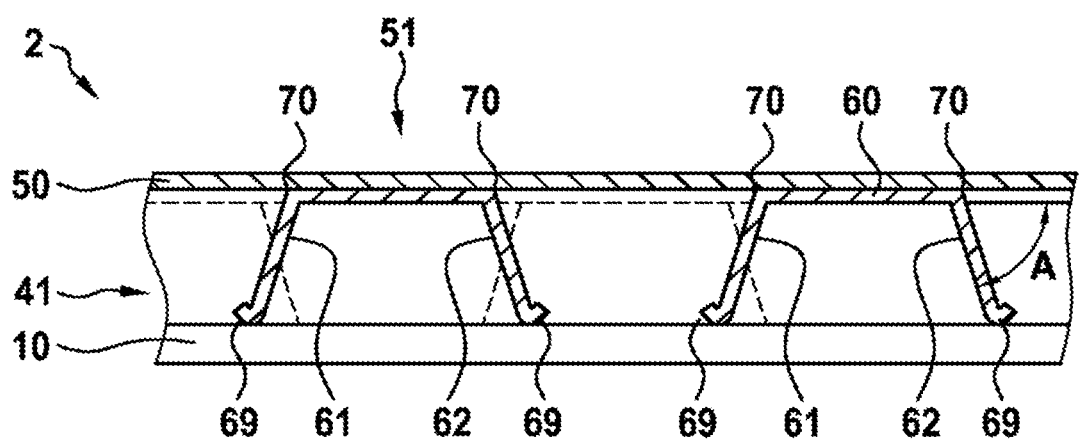
FIG. 5 shows a front view of the structural part from FIG. 4.

FIG. 5 shows a front view of the first structural part 51 from FIG. 4. The first wings 61 and the second wings 62 project away from the longitudinal sides 70 of the openings 65 and extend up to the membrane-electrode unit 10. A wing angle A is in each case formed between the wings 61, 62 and the openings 65 in the base member 60. The ends of the wings 61, 62 remote from the base member 60 of the first structural part 51 each have a deflection 69. The deflection 69 can prevent damage to the membrane-electrode unit 10.

The width of the lateral sides 72 is predetermined by the height of the first media chamber 41 and the wing angle A and by the embodiment of the deflection 69. The wing angle A is in a range between 70° and 90°, preferably between 80° and 90°. The wing angle A and deflection 69 can apply a pre-pressure to the membrane-electrode unit 10 in order to improve electrical contact.

Figure 6:
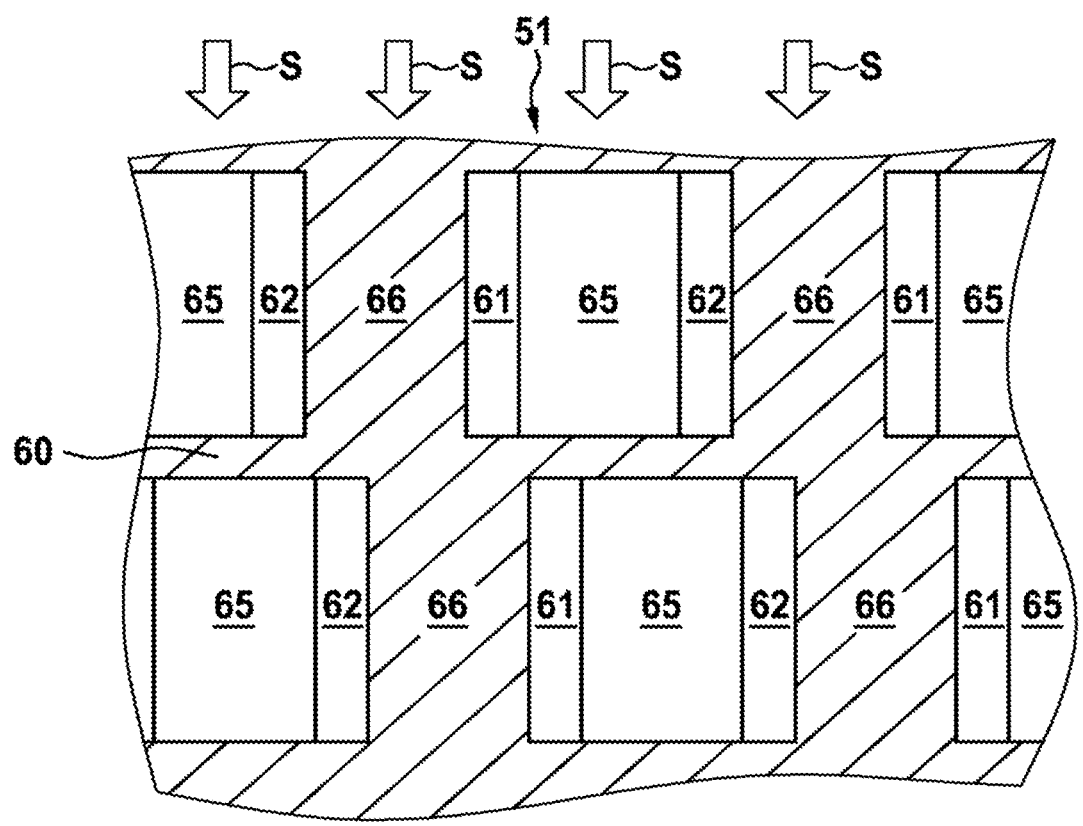
FIG. 6 shows a plan view of a structural part according to a second variant of the fuel cell from FIG. 3.
Figure 7:
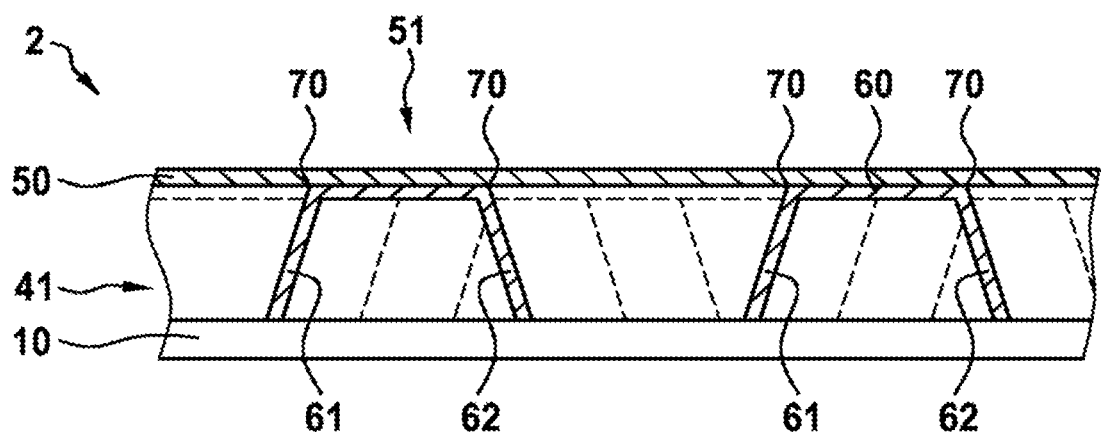
FIG. 7 shows a front view of the structural part from FIG. 6.

FIG. 6 shows a plan view of the first structural part 51 according to a second variant of the fuel cell 2 from FIG. 3, and FIG. 7 shows a front view of the first structural part 51 from FIG. 6. The openings 65 are arranged in rows as in the first variant shown in FIG. 4 and FIG. 5 and adjacent openings 65 in one row are separated from one another by webs 66.

At variance with the first variant, in the present case the openings 65 in successive rows are offset from one another by about one third of the width of the lateral sides 72. Irregular offsets of the openings 65 in successive rows are furthermore conceivable.

Figure 8:
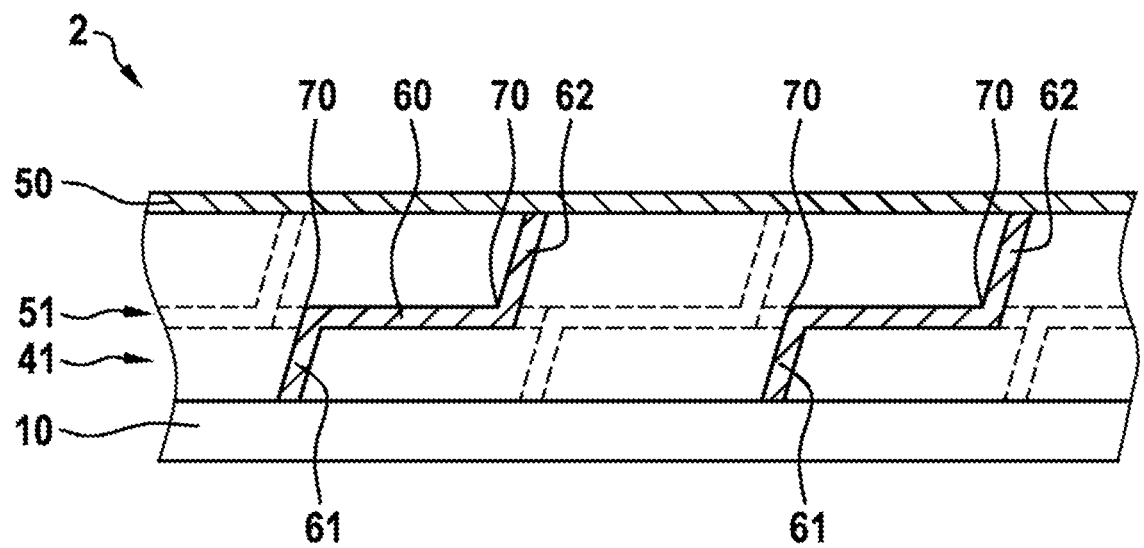
FIG. 8 shows a front view of a structural part according to a third variant of the fuel cell from FIG. 3.

FIG. 8 shows a front view of the first structural part 51 according to a third variant of the fuel cell 2 from FIG. 3. The separator plate 50 likewise takes the form of a flat metal sheet. At variance with the first and second variants, the base member 60 of the first structural part 51 is spaced from the separator plate 50 and is for example located in the middle of the first media chamber 41.

The first wings 61 project from longitudinal sides 70 of the openings 65 to the membrane-electrode unit 10. The second wings 62 project from the respective opposing longitudinal sides 70 of the openings 65 to the separator plate 50.

Figure 9:
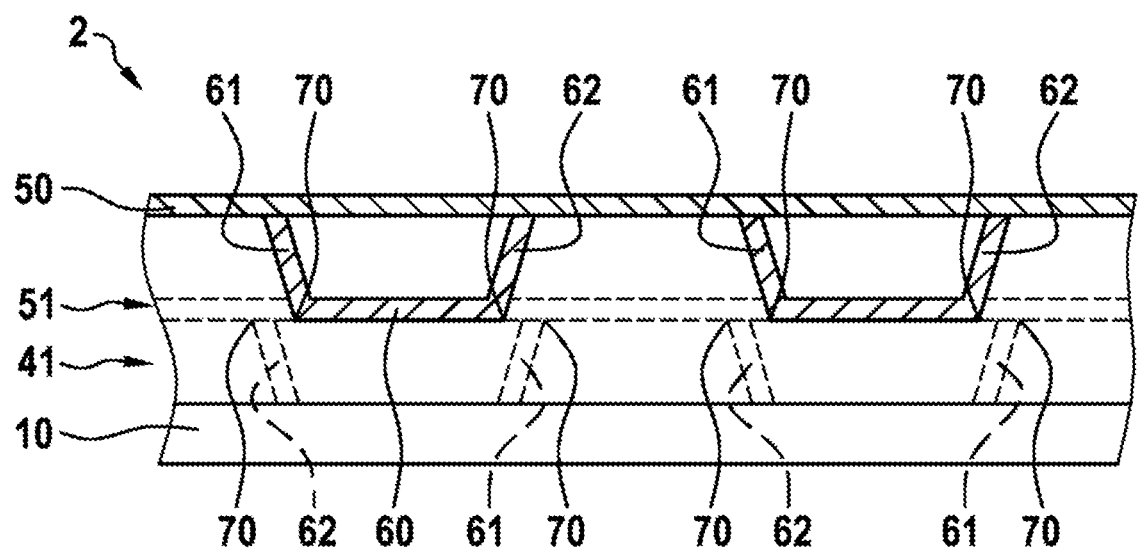
FIG. 9 shows a front view of a structural part according to a fourth variant of the fuel cell from FIG. 3

FIG. 9 shows a front view of the first structural part 51 according to a fourth variant of the fuel cell 2 from FIG. 3. As in the third variant, the base member 60 of the first structural part 51 is spaced from the separator plate 50 and is for example located in the middle of the first media chamber 41. The openings 65 are arranged in rows in the base member 60.

The wings 61, 62 project from the longitudinal sides 70 of the openings 65 in one row to the membrane-electrode unit 10. The wings 61, 62 project from the longitudinal sides 70 of the openings 65 in the adjacent rows to the separator plate 50.

Figure 10:
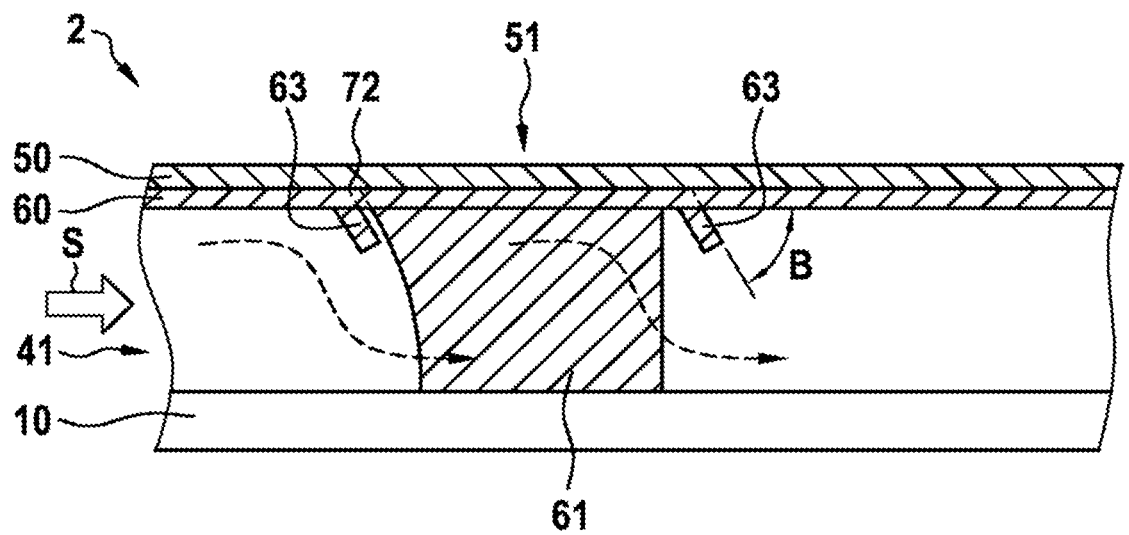
FIG. 10 shows a section through a fuel cell according to a second embodiment.

FIG. 10 shows a section through a fuel cell 2 according to a second embodiment. From one lateral side 72 of the openings 65, a fin 63 in each case projects away from the base member 60 and extends into the first media chamber 41. The fin 63 here extends at right angles to the direction of flow S. Flow of the fuel can be deflected in targeted manner towards the membrane-electrode unit 10 by means of the fin 63.

A fin angle B is here in each case formed between the fins 63 and the openings 65 in the base member 60. The fin angle B is in a range between 30° and 90°, preferably between 45° and 90°.

Figure 11:
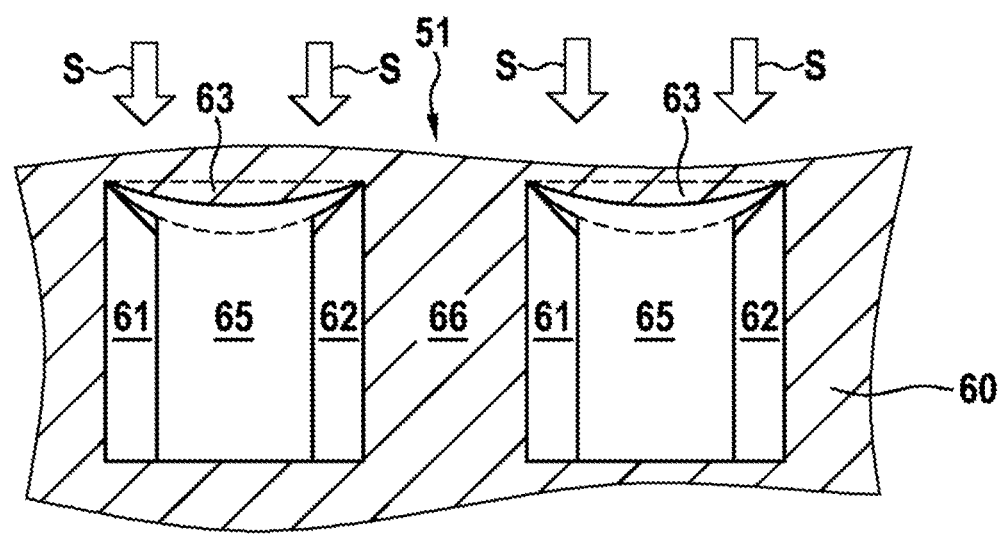
FIG. 11 shows a plan view of a structural part of the fuel cell from FIG. 10.
Figure 12:
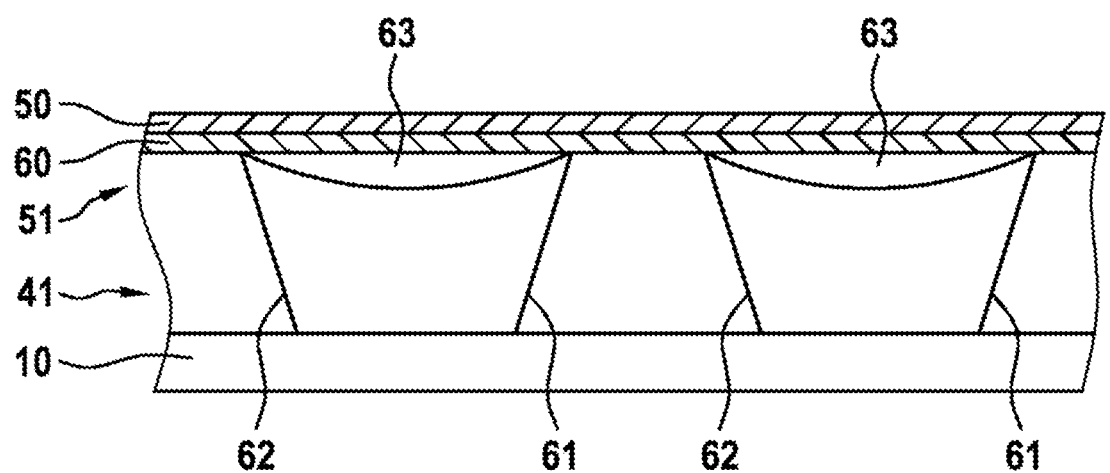
FIG. 12 shows a front view of the structural part from FIG. 11.

FIG. 11 shows a plan view of the first structural part 51 of the fuel cell 2 from FIG. 10, and FIG. 12 shows a front view of the first structural part 51 from FIG. 11. The maximum length of the fin 63 amounts to at most 0.7 times the height of the first media chamber 41, preferably at most 0.5 times the height of the first media chamber 41, more preferably at most 0.3 times the height of the first media chamber 41.

Figure 13:
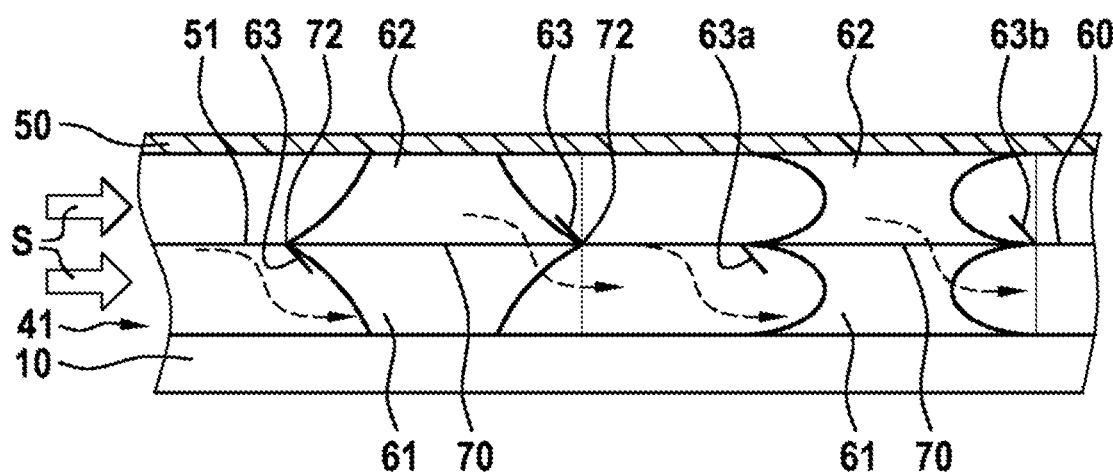
FIG. 13 shows a section through a fuel cell according to a third embodiment.

FIG. 13 shows a section through a fuel cell 2 according to a third embodiment. The base member 60 of the first structural part 51 is spaced from the separator plate 50 and is for example located in the middle of the first media chamber 41. The first wings 61 project from longitudinal sides 70 of the openings 65 to the membrane-electrode unit 10, and the second wings 62 project from the respective opposing longitudinal sides 70 of the openings 65 to the separator plate 50.

A fin 63 in each case projects away from the base member 60 towards the membrane-electrode unit 10 from the lateral side 72 of the openings 65 which is located upstream in the direction of flow S. A fin 63 in each case projects away from the base member 60 towards the separator plate 50 from the opposing lateral side 72 of the openings 65 which is located downstream in the direction of flow S. Flow of the fuel can be deflected in targeted manner towards the membrane-electrode unit 10 by means of the fins 63.

Figure 14:
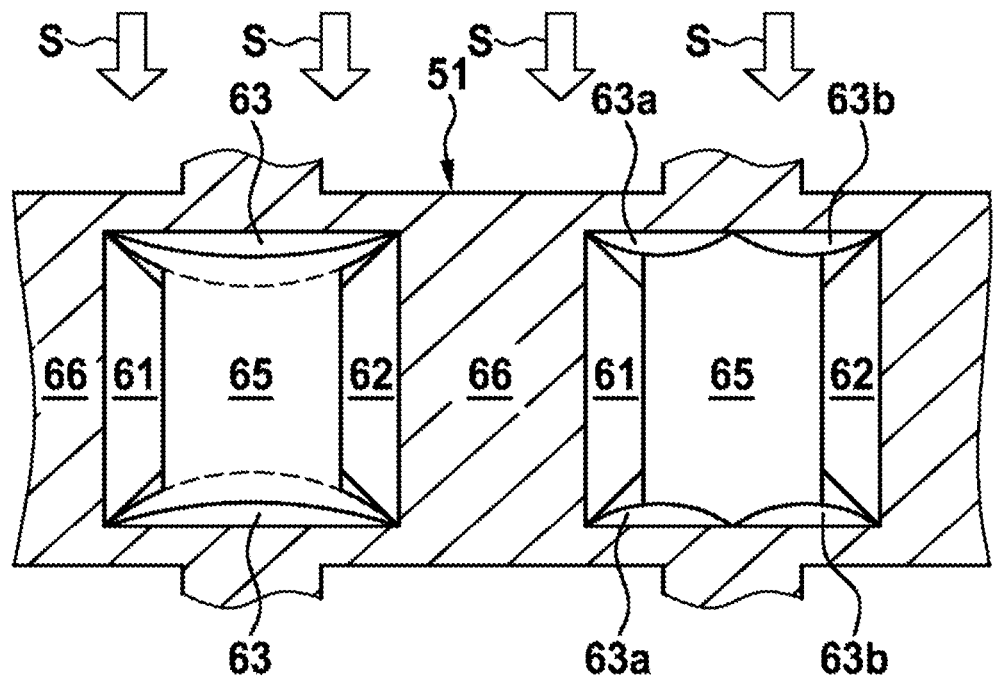
FIG. 14 shows a plan view of a structural part of the fuel cell from FIG. 13.
Figure 15:
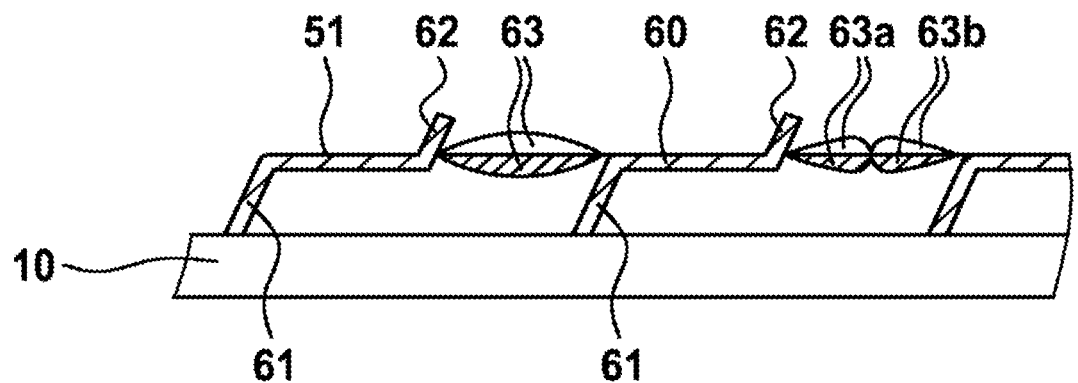
FIG. 15 shows a front view of the structural part from FIG. 14.

FIG. 14 shows a plan view of the first structural part 51 of the fuel cell 2 from FIG. 13, and FIG. 15 shows a front view of the first structural part 51 from FIG. 14. The maximum length of the fins 63 amounts to at most 0.3 times the height of the first media chamber 41.

As shown in FIG. 13, FIG. 14 and FIG. 15 in each case on the left-hand side, the fins 63 are in each case of one-piece construction. The contact surfaces of the wings 61, 62 with the membrane-electrode unit 10 and with the separator plate 50 are consequently smaller.

As shown in FIG. 13, FIG. 14 and FIG. 15 in each case on the right-hand side, the fins 63 are in each case of two-part construction and in each case comprise a first sub-fin 63a and a second sub-fin 63b. The contact surfaces of the wings 61, 62 with the membrane-electrode unit 10 and with the separator plate 50 are in each case consequently increased in size in comparison with the representations on the respective left-hand side.

Figure 16:
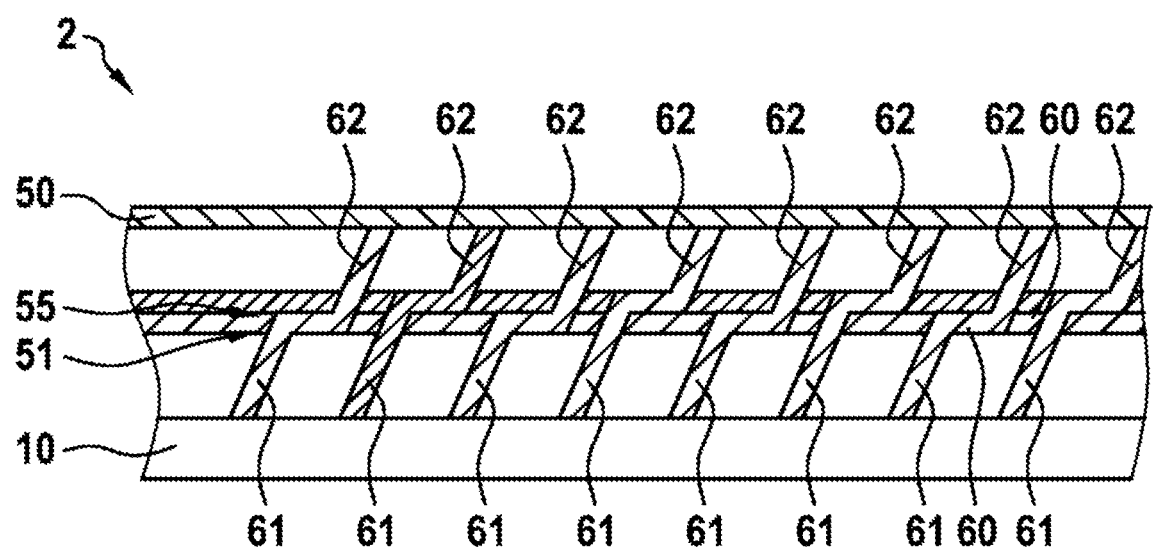
FIG. 16 shows a section through a fuel cell according to a fourth embodiment and FIG. 17 shows a section through a fuel cell according to a fifth embodiment.

FIG. 16 shows a section through a fuel cell 2 according to a fourth embodiment. First wings 61 project from the longitudinal sides 70 of the openings 65 in the base member 60 of the first structural part 51 to the membrane-electrode unit 10, and second wings 62 project to the separator plate 50.

The bipolar plate 40 here additionally comprises a structural element 55 which has a base member 60 into which openings 65 are likewise introduced. First wings 61 likewise project from the longitudinal sides 70 of the openings 65 in the base member 60 of the structural element 55 to the membrane-electrode unit 10, and second wings 62 project to the separator plate 50. In the present case, the base member 60 of the structural element 55 lies against the base member 60 of the first structural part 51.

The first structural part 51 and the structural element 55 are arranged such that the first wings 61 of the structural element 55 project through the openings 65 of the first structural part 51 and that the second wings 62 of the first structural part 51 project through the openings 65 of the structural element 55.

Figure 17:
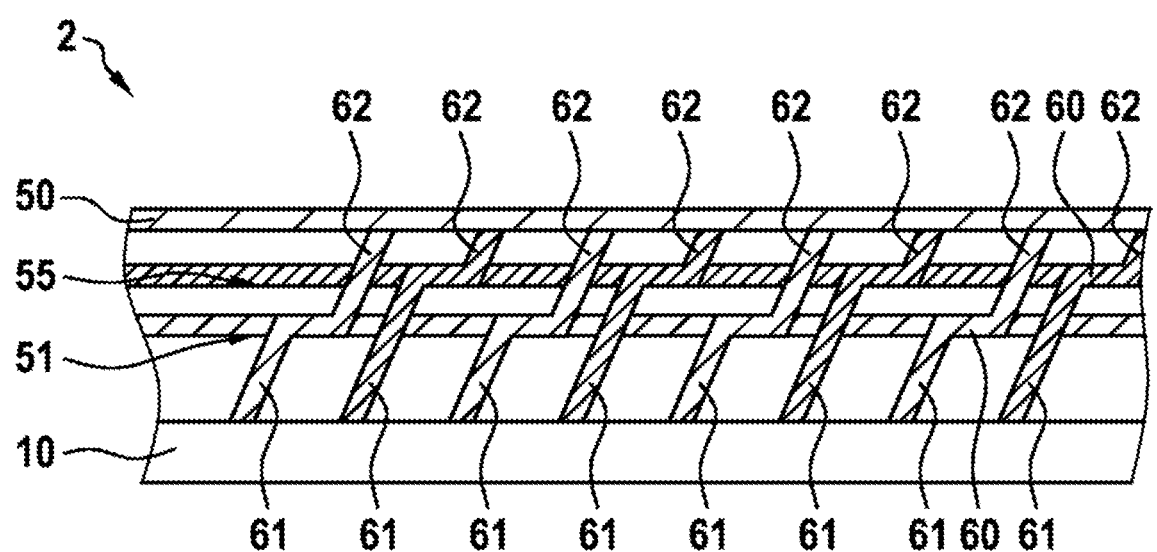

FIG. 17 shows a section through a fuel cell 2 according to a fifth embodiment which is similarly constructed to the fuel cell 2 according to the fourth embodiment shown in FIG. 16. At variance with the fuel cell 2 according to the fourth embodiment, in the fuel cell 2 according to a fifth embodiment, the base member 60 of the structural element 55 is spaced from the base member 60 of the first structural part 51.

In the fourth and fifth embodiments of fuel cell 2, there is an increase in the number of contact points and contact surfaces with the membrane-electrode unit 10 and with the separator plate 50. The spacing between the contact rows can furthermore be made smaller while a continuous current path from membrane-electrode unit 10 to separator plate 50 nevertheless remains. A greater current-carrying capacity is consequently achieved, whereby the base members 60 of the structural parts 51, 52 and of the structural element 55 can have a smaller material thickness.

The invention is not restricted to the exemplary embodiments described and the aspects emphasized herein. Instead, a plurality of modifications which are within the ability of a person skilled in the art are possible within the scope defined by the claims.

The invention claimed is:

1. A fuel cell (2) comprising
at least one membrane-electrode unit (10) and
at least one bipolar plate (40) including a separator plate (50), and at least one structural part (51) which has a base member (60) having openings (65) therein, having first wings (61) which project away from first sides (70, 72) of the openings (65) and extend to the at least one membrane-electrode unit (10) and second wings (62) which project away from second sides (70, 72) of the openings,
wherein the base member (60) of the at least one structural part (51) is spaced from the separator plate (50), and the second wings (62) extend from the second sides (70, 72) of the openings (65) of the structural part (51) to the separator plate (50),
wherein the bipolar plate (40) also includes at least one structural element (55) which has a base member (60) having therein openings (65), and having first wings (61) which project away from first sides (70, 72) of the openings (65) of the structural element (55), and second wings (62) which project away from second sides (70, 72) of the openings (65) of the structural element (55),
wherein the first wings (61) of the structural element (55) extend through the openings (65) of the structural part (51),
wherein the second wings (62) of the structural part (51) extend through openings (65) of the structural element (55), and
wherein each of the first wings (61) of the structural part (51) have a free end contacting the at least one membrane-electrode unit (10), wherein each of the second wings (62) of the structural part (51) have a free end contacting the separator plate (50), wherein each of the first wings (61) of the structural element (55) have a free end contacting the at least one membrane-electrode unit (10), wherein each of the second wings (62) of the structural element (55) have a free end contacting the separator plate (50).

2. The fuel cell (2) as claimed in claim 1, characterized in that the base member (60) of the at least one structural part (51) lies against the separator plate (50).

3. The fuel cell (2) as claimed in claim 1, characterized in that the base member (60) of the structural element (55) lies against the base member (60) of the structural part (51).

4. The fuel cell (2) as claimed in claim 1, characterized in that the base member (60) of the structural element (55) is spaced from the base member (60) of the structural part (51).

5. A fuel cell (2) comprising at least one membrane-electrode unit (10) and at least one bipolar plate (40) including a separator plate (50), and at least one structural part (51) which has a base member (60) having openings (65) therein, having first wings (61) which project away from first sides (70) of the openings (65) and extend to the at least one membrane-electrode unit (10), and second wings (62) which project away from second sides (70) of the openings, wherein the openings (65) are rectangular in shape and have opposing longitudinal sides (70) and opposing lateral sides (72) perpendicular to the opposing longitudinal sides (70), wherein the first and second wings (61, 62) project away from the opposing longitudinal sides (70) of the openings (65), and wherein at least one fin (63) projects away from the base member (60) from at least one of the opposing lateral sides (72) of the openings (65).

6. The fuel cell (2) as claimed in claim 1, characterized in that the free ends of the first and second wings (61, 62) of the structural part (51) remote from the base member (60) have a deflection (69).

7. A vehicle comprising a fuel cell (2) as claimed in claim 1.

8. The vehicle as claimed in claim 7, wherein the vehicle is an electric vehicle (EV).

9. The vehicle as claimed in claim 7, wherein the vehicle is a hybrid vehicle (HEV).

10. The vehicle as claimed in claim 7, wherein the vehicle is a plug-in hybrid vehicle (PHEV).

11. The fuel cell (2) as claimed in claim 5, characterized in that the base member (60) of the at least one structural part (51) lies against the separator plate (50).

12. The fuel cell (2) as claimed in claim 5, characterized in that ends of the first and second wings (61, 62) remote from the base member (60) have a deflection (69).

13. A vehicle comprising a fuel cell (2) as claimed in claim 5.

14. The vehicle as claimed in claim 13, wherein the vehicle is an electric vehicle (EV).

15. The vehicle as claimed in claim 13, wherein the vehicle is a hybrid vehicle (HEV).

16. The vehicle as claimed in claim 13, wherein the vehicle is a plug-in hybrid vehicle (PHEV).

* * * * *